Dec. 28, 1948.    H. KRENZ    2,457,384
CLAMP FOR SPHERICAL JOINTS
Filed Feb. 17, 1947
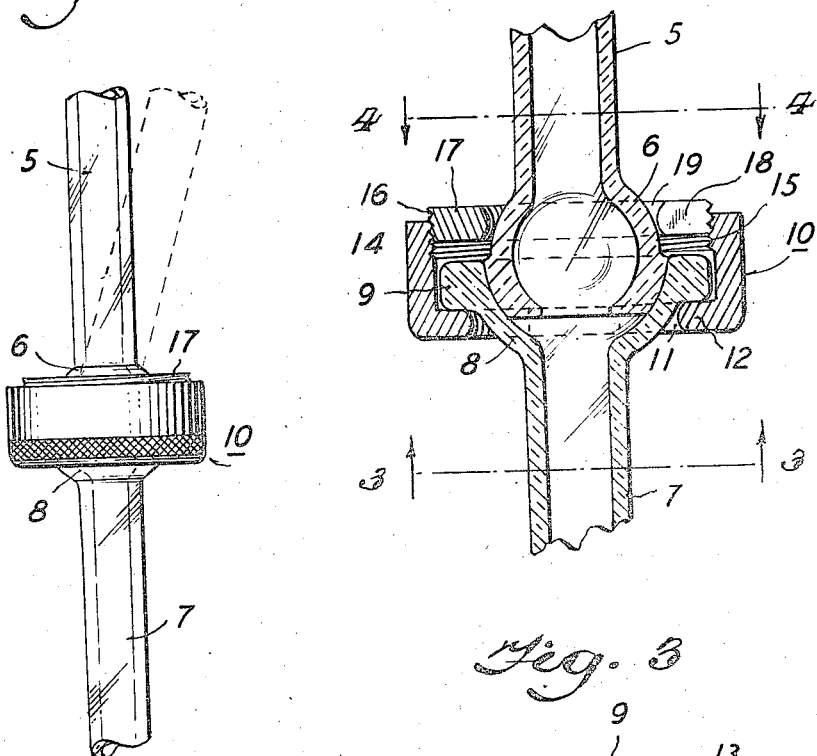
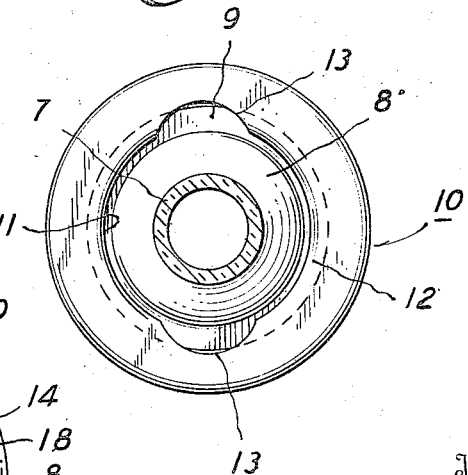
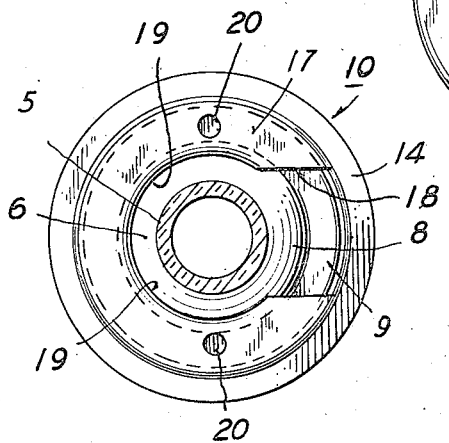
Inventor
HARRY KRENZ
By Prevost & Prevost
Attorneys Patented Dec. 28, 1948

2,457,384

UNITED STATES PATENT OFFICE 2,457,384

CLAMP FOR SPHERICAL JOINTS

Harry Krenz, Somers Point, N. J., assignor to Ace Glass Incorporated, Vineland, N. J.

Application February 17, 1947, Serial No. 729,079

3 Claims. (Cl. 285—95)

This invention relates to pipe couplings, and more particularly to a clamp for spherical joints.

One of the objects of the invention is to provide a clamp of simple construction, and including only two essential parts, one being a cup designed to receive the female member of the joint, and the other a bifurcated disk to engage the male member of the joint; the sections of the clamp being so constructed that they can be arranged on the ball and socket in situ, so as to make it unnecessary to place the sections over ends of the pipes or the like, remote from the ball and socket.

With the foregoing object outlined and with other objects in view which will appear as the description proceeds, the invention consists in the novel features hereinafter described in detail, illustrated in the accompanying drawing, and more particularly pointed out in the appended claims:

In the drawing:

Fig. 1 is a side elevation of a pair of tubes arranged end-to-end and having a cooperating ball and socket connected together by my improved clamp.

Fig. 2 is an enlarged vertical sectional view of the structure shown in Fig. 1.

Figs. 3 and 4 are transverse sectional views taken respectively on the lines 3—3 and 4—4 of Fig. 2.

Referring to the drawing, 5 designates an upper tube terminating at its lower end in a ball or spherical portion 6. 7 designates a lower tube terminating at its upper end in a ball-receiving socket 8. These parts are of conventional construction, and in the exemplification of the invention illustrated, they are made of glass. In such construction, the socket terminal is provided with an external, circular flange 9.

In accordance with the present invention, a cup 10, made of any suitable material, such as metal or plastics, is provided with a bottom opening 11, surrounded by a flange 12. As best shown in Fig. 3, the opening 11 is enlarged at diametrically opposite points, by notches 13, and the distance between the outermost portions of the notches is greater than the diameter of the flange 9 so that the flange may be threaded through the bottom of the cup in applying the cup to the female member of the joint. The wall 14 of the cup has internal threads 15, arranged adjacent the upper portion of the wall for engagement with threads 16 at the outer edge of the disk-like member 17 of the clamp. As best shown in Fig. 4, the member 17 is bifurcated to provide a radial opening 18 leading to the central opening 19 of the disk. Due to this construction, the disk can be slipped onto the tube 5 from the side thereof, and then lowered into position to be screwed into the cup 10 so as to cooperate with the spherical terminal 6 in maintaining the joint.

Diametrically opposite holes 20 may be provided in the top of the disk for the reception of the pins of a tool employed in turning the disk.

While the clamp has been illustrated in connection with sections of pipe, it is obvious that it can be employed with sections of rods, or the like, and it is evident that changes may be made in the details disclosed without departing from the spirit of the invention, as expressed in the following claims:

What I claim and desire to secure by Letters Patent is:

1. A clamp for substantially spherical joints having male and female members, said clamp comprising a cup having an open bottom mainly of smaller inside diameter than the outside diameter of said female member, said opening being enlarged at diametrically opposite points to clear the widest portion of the diameter of said female member and permit the insertion of the latter in said opening, and a disc having threaded engagement with the cup and provided with a central opening which communicates with the edge of said disc through a lateral opening to permit the disc to be slipped sideways onto the male member of said joint.

2. A clamp for spherical pipe joints or the like, comprising a cup having a circular wall provided with threads and an open bottom bounded by an inwardly extending flange provided with diametrically opposite notches for permitting the insertion of the female member of the joint, the main diameter of the bottom opening being smaller than the outside diameter of the female member, and a disk having threads engaging the threads of the cup, said disk having a central opening for the reception of the male member of the joint, said disk also having a lateral opening extending from its central opening to the edge thereof to permit the disk to be slipped sideways onto a pipe or the like connected to the male member.

3. In a structure of the character described, a pair of rod-like members terminating in interengaging male and female members having partispherical external surfaces, the female member having a terminal external circular flange, a cup having an annular wall and an inwardly extending flange defining an opening in the bottom of the cup through which the female member extends, the flange of the female member engaging the flange of the cup, said cup flange being provided with diametrically opposite notches to permit the flange of the female member to be inserted into the cup through the bottom thereof, and a disk adapted to bear against the parti-spherical surface of the male member and having threaded engagement with the cup, said disk being of bifurcated form whereby it can be placed sideways on the rod-like member which is provided with the male member of the joint.

HARRY KRENZ.

REFERENCES CITED

The following references are of record in the file of this patent:

UNITED STATES PATENTS

| Number | Name | Date |
|---|---|---|
| 2,388,633 | De Woody | Nov. 6, 1945 |
| 2,397,438 | Schmid | Mar. 26, 1946 |